United States Patent Office 3,100,960
Patented Aug. 20, 1963

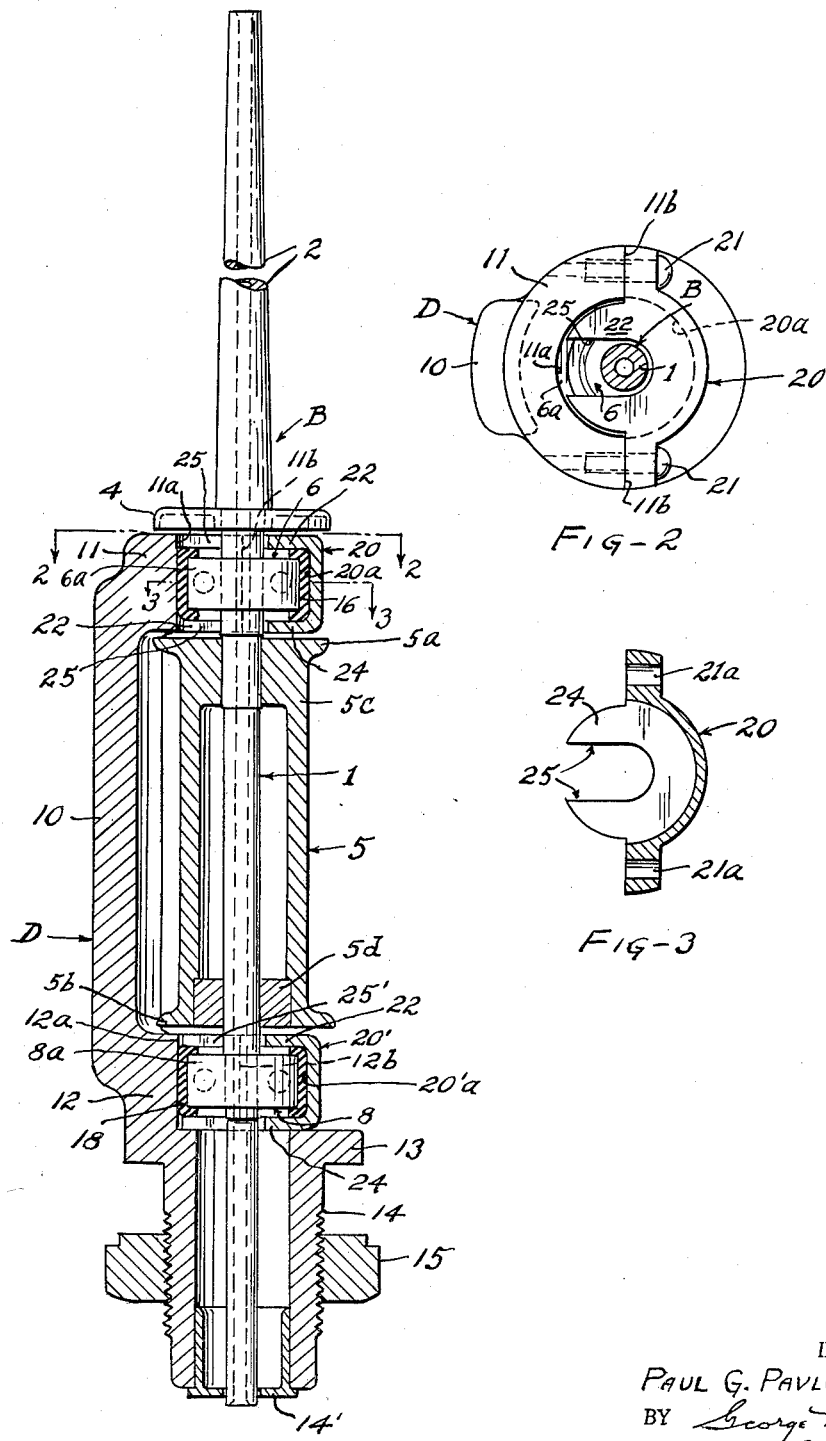

3,100,960
TEXTILE SPINDLES
Paul G. Pavlovich, Jr., Euclid, Ohio, assignor to Curtiss-Wright Corporation, a corporation of Delaware
Filed Oct. 10, 1961, Ser. No. 144,269
2 Claims. (Cl. 57—130)

This invention relates to a textile spindle unit or assembly of the type in which prelubricated and sealed antifriction bearing units are secured in axially fixed position on a spindle blade, and the blade, whorl and bearing assembly (hereinafter sometimes blade unit) includes resilient (e.g., elastomer) cushioning or vibration damping collars or boots snugly embracing the outer bearing race members and adapted to be seated snugly in a rigid supporting base or bracket mounted on the spindle rail or other carrier (e.g., spindle swing) for cooperation with a driving tape or belt.

One known type of spindle construction enabling free turning support of a blade unit such as described above, has a rigid base or bracket comprising principally two mutually complementary half shells cast with semi-cylindrical matching sockets to receive and support the resilient collars when the shells are secured together as by screws. In that known type of construction the axial spacing of the bearing race members must substantially exactly match the spacing of the sockets and, in one heretofore proposed construction, the driving whorl constitutes a cantilever or overhanging portion of the spindle assembly in respect to the bearings and their support. Such overhang of the driving-force-receiving portion of the blade unit is undesirable.

Yieldably supported prelubricated antifriction bearings of spindle blade units have also been mounted on an open-sided mounting bracket or base member in such manner that the whorl lies between the bearings, but most of such prior constructions have required sliding of the yieldable collars of the bearing units axially into respective retaining sockets. That is difficult of accomplishment; the required auxiliary (e.g., retaining) equipment is expensive, and the installation operations are apt to distort or displace one or both of the yieldable collars in such manner that the antifriction elements are bound against each other and thereby subjected to unnecessary wear.

The present spindle avoids the undesired overhang just above discussed; is relatively inexpensive, the antifriction bearing units rigidly mounted on the blade as by force fitting can be easily and accurately installed mainly by axial movement of the blade and bearing assembly and are not subject to dislocation or binding. The invention has other novel features as will be explained below.

In the accompanying drawing FIG. 1 is principally a central longitudinal sectional view of the present spindle assembly as arranged for a special twisting operation.

FIGS. 2 and 3 are transverse sectional views taken as indicated at 2—2 and 3—3 respectively on FIG. 1.

The rotating portion or "blade unit" B of the hollow blade spindle or spindle assembly, FIG. 1, is an integral metal tube 1 through which a filament such as a rubber strand progresses upwardly for unification with another filament or cord being unwound from a bobbin, not shown, carried on the upwardly extending tapered portion 2 of the tube 1.

The tube 1 of blade unit B is of stepped cylindrical construction below the base of the tapered portion 2, providing shoulders for axially locating a circular guard or slinger 4 (optional), a hollow whorl or whorl assembly 5, and at least one of the two antifriction bearing units or bearings 6 and 8. Only the bearing 8 engages an axial shoulder in the illustrated construction.

Blade unit B, as shown, is supported for rotation about its longitudinal axis on a generally C-shaped base or bracket D having an upright main body portion 10 and upper and lower horizontal arm portions 11 and 12 respectively. Each of the arm portions has a bearing-unit-receiving smooth, semi-cylindrical socket surface, as at 11a and 12a respectively, terminating, toward the open side of the C-shaped bracket D rightwardly as in FIG. 1, in substantially flat coplanar faces 11b and 12b (cf. FIG. 2). A conventional mounting flange formation 13 is integral with the arm portion 12 below which the base or bracket D is suitably adapted, via a threaded tubular portion 14 and clamping nut 15 thereon, for mounting of the spindle assembly on a rail, swing arm or the like, not shown. The lower end of the bore in bracket portion 14 is closed by a cap plug 14′ closely surrounding the lower free end of the blade tube 1.

The antifriction bearing units 6 and 8 have their yieldable cushioning or vibration-damping collars 16 and 18, shown of typical channel shaped cross section, in snug fitting relation to the outer races 6a and 8a of the respective bearing units radially and axially of the blade unit.

The blade unit B, via attaching screws 21 as in FIG. 2, is secured in place on the bracket D by two generally semicircular caps 20 and 20′ of operatingly identical construction and with their inner semi-cylindrical socket surfaces 20a and 20′a lying diametrically opposite and matching the socket surfaces 11a and 12a in the arm portions 11 and 12 of the bracket or base D.

In order that there need be no static loading or axial crowding of the antifriction bearings via their yieldable collars 16 and 18 (such as could produce binding as of the bearing balls in their races) and in order to enable placement and removal of the blade member, whorl and bearing assembly (unit B) from its mounting bracket (base D) principally by movement of that assembly axially of the blade member, the caps 20 and 20′ have parallel top and bottom plate portions as at 22 and 24 spaced apart sufficiently for snug reception of the yieldable collar flange portions between them. The plate portions all have rearwardly open slots 25 and 25′, one shown at 25 in FIGS. 2 and 3, loosely around the respectively associated portions of the blade member 1. Assuming the shanks of the fastening screws 21 are somewhat loose in the holes 21a (FIG. 3) of the paired arm portions of the caps 20 and 20′, the center-to-center axial spacing of the bearing unit assemblies, or the vertical spacing of the two pairs of threaded openings in the bracket arms 11 and 12 which receive the screws 21 can vary within fairly wide limits without axially loading the bearing units at standstill condition or crowding the antifriction components.

Complementing the previously mentioned guard or slinger 4 which lies just above the upper horizontal wall or plate portion 22 of the upper cap 20, hence its open slot 25, the whorl assembly 5 has circular flanges 5a and 5b lying close to associated horizontal plate portions of the upper and lower caps 20 and 20′ and covering the slots in those plate portions. The whorl assembly as shown has a main tubular body with an annular insert 5d and the bores in the top wall of the main body 5c and of the insert are in interference fitting relationship to associated cylindrical portions of the blade tube 1. After the guard 4 and the inner race of the bearing unit 6 have been secured in proper position to the blade tube 1, as by press fitting, the whorl unit 5 is (e.g.) press fitted to the tube, and then the bearing 8 is similarly secured, all in suitably gauged proper axial relationship.

Usually the lubricant sealed in the bearing units 6 and 8 lasts for the expected life of the spindle but, if the seals are removable for repacking or are arranged to receive lubricant injected through a hollow needle, adequate surface portions of the bearing seals are exposed for so replenishing lubricant when the caps 20 and 20' are detached from the bearing units and the base D and the blade unit B is then removed from the base.

I claim:

1. A textile spindle comprising a rigid mounting base adapted to be so disposed as to have an upright portion and vertically spaced apart arm portions terminating in generally semi-cylindrical coplanar cavities open in a direction away from the upright portion, a blade assembly including an elongated blade member having two axially spaced apart, self contained and sealed antifriction bearing units thereon, each having a circular rigid outer race and a resilient non-metallic flanged collar radially embracing the race and lying snugly against it axially in at least one direction, said collars fitting respective said coplanar cavities, and rigid one-piece caps having similar cavities matching the base cavities and adapted to cooperate therewith snugly to embrace the collars radially, the caps having respective paired arm portions integral therewith respectively abutting the collars axially of the blade assembly in regions extending considerably more than half a circumference around the axis of the blade member whereby to hold the bearing units in place without imposing axial load thereon, said blade assembly further including a driving whorl on the blade member disposed between the arm portions of the base.

2. A textile spindle comprising a rigid mounting base adapted to be so disposed as to have an upright portion and vertically spaced apart arm portions terminating in generally semi-cylindrical coplanar cavities open in a direction away from the upright portion, a blade assembly including an elongated blade member having two axially spaced apart, self contained and sealed antifriction bearing units thereon, each having a circular rigid outer race and a resilient non-metallic flanged collar radially and axially embracing the race, said collars fitting respective said coplanar cavities, and rigid caps having similar cavities matching the base cavities and adapted to cooperate therewith snugly to embrace the collars radially, the caps having rigid arm portions snugly embracing respective collars axially and radially of the blade assembly, said blade assembly further including a driving whorl on the blade member disposed between the arm portions of the base, the arm portions of the caps being bifurcated to form slots open toward the base, loosely embracing the associated portions of the blade member and extending therebeyond toward the base member.

References Cited in the file of this patent
UNITED STATES PATENTS 2,883,824    Andrews et al. _____ Apr. 20, 1959
2,914,905    Andrews et al. _____ Dec. 1, 1959